(12) United States Patent
Hsu et al.

(10) Patent No.: US 6,950,660 B1
(45) Date of Patent: Sep. 27, 2005

(54) PROVISIONING A MOBILE DEVICE IN A WIRELESS COMMUNICATION SYSTEM

(75) Inventors: Raymond T. Hsu, San Diego, CA (US); Nobuyuki Uchida, San Diego, CA (US); Nileshkumar J. Parekh, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 257 days.

(21) Appl. No.: 10/144,189

(22) Filed: May 10, 2002

(51) Int. Cl.[7] .............................................. H04Q 7/20
(52) U.S. Cl. ..................... 455/456; 455/414; 455/419; 455/466; 455/433; 370/389; 370/328; 379/219; 379/229; 379/230
(58) Field of Search ............................. 455/466, 435, 455/405, 456, 414, 419, 433; 370/329, 338, 370/352, 356, 401, 389, 328; 379/219, 229, 379/230

(56) References Cited

U.S. PATENT DOCUMENTS

| | | | | |
|---|---|---|---|---|
| 6,144,849 | A * | 11/2000 | Nodoushani et al. | 455/419 |
| 6,205,126 | B1 * | 3/2001 | Moon | 370/329 |
| 6,453,162 | B1 * | 9/2002 | Gentry | 455/433 |
| 2002/0123335 | A1 * | 9/2002 | Luna et al. | 455/419 |
| 2003/0027581 | A1 * | 2/2003 | Jokinen et al. | 455/456 |
| 2003/0108039 | A1 * | 6/2003 | Shell et al. | 370/389 |
| 2004/0176086 | A1 * | 9/2004 | Chatterjee et al. | 455/418 |

FOREIGN PATENT DOCUMENTS

| | | | | |
|---|---|---|---|---|
| GB | 2342816 A | * | 4/2000 | G06F 13/00 |

OTHER PUBLICATIONS

Wireless Application Protocol (WAP-183-ProvCont-20010724-a), Provisioning Content, Version 24- Jul. 2001 (59 pages).
TIA/EIA/IS-683-A "Over-the-Air Service Provisioning of Mobile Stations in Spread Sprectrum System" Jun. 1998.
TIA/EIA/IS-683-B "Over-the-Air Service Provisioning of Mobile Stations in Spread Spectrum Systems" Dec. 2001.
"IW between PLMN and PDN Rel. 4," 3GPP TS 29.031 Technical Specification, retrieved from the internet: <URL: www.3gpp.org>, Mar. 2002.
"WAP-182-ProvArch-20010314-a," WAP Provisioning Architecture Overview, retrieved from the internet: <URL: www.wapforum.org>, Mar. 14, 2001.
"WAP-184-ProvBoot-20010314-a," WAP Provisioning Bootstrap, retrieved from the internet: <URL:www.wapforum.org>, Mar. 14, 2001.

* cited by examiner

*Primary Examiner*—Erika A. Gary
*Assistant Examiner*—Julio Perez
(74) *Attorney, Agent, or Firm*—Philip R. Wadsworth; Thien T. Nguyen; Roberta A. Young

(57) ABSTRACT

Method and apparatus for providing provisioning parameters to a mobile device. A short messaging service message is used to send bootstrap data sufficient to establish communication between an Internet Protocol-based server and a mobile device. The mobile device then establishes such communication and the provisioning parameters from the Internet Protocol-based server.

13 Claims, 3 Drawing Sheets

PROVISIONING A MOBILE DEVICE IN A WIRELESS COMMUNICATION SYSTEM

BACKGROUND

1. Field

The present invention relates to wireless communication systems generally and specifically, to methods and apparatus for provisioning a mobile device in a wireless communication system using a short messaging service to establish communication to an Internet Protocol (IP) based server.

2. Background

To establish communication with a mobile device, the system first provides provisioning parameters to the mobile device. The provisioning parameters assist the mobile device in communications within and as part of the system. The provisioning parameters are typically provided by the service provider at a point of purchase, such as a cellular service center, or accessed from the service provider using circuit switching communications. Often the subscriber is instructed on a sequence of key strokes to send to the service provider; the service provider in response sends the provisioning parameters as a wireless transmission.

The initial transfer of provisioning parameters may be transmitted to the mobile device using the Wireless Application Protocol, referred to as WAP. The WAP is an application environment and set of communication protocols for wireless devices designed specifically for access to the Internet and higher telephony functions. Devices supporting WAP incur additional cost and complexity.

There is a need, therefore, for a low-cost method for providing provisioning parameters to a mobile device which do not support WAP applications or browser.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Note that the exemplary embodiment is provided as an example throughout this discussion; however, alternate embodiments may incorporate various aspects without departing from the scope of the present invention. Specifically, the various embodiments are applicable to a data processing system, a wireless communication system, a mobile IP network and any other system desiring efficient use and management of resources.

The exemplary embodiment employs a spread-spectrum wireless communication system. Wireless communication systems are widely deployed to provide various types of communication such as voice, data, and so on. These systems may be based on Code Division-Multiple Access (CDMA), Time Division Multiple Access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA2000 standard of protocols. Alternate embodiments may incorporate another standard.

Figure 1:
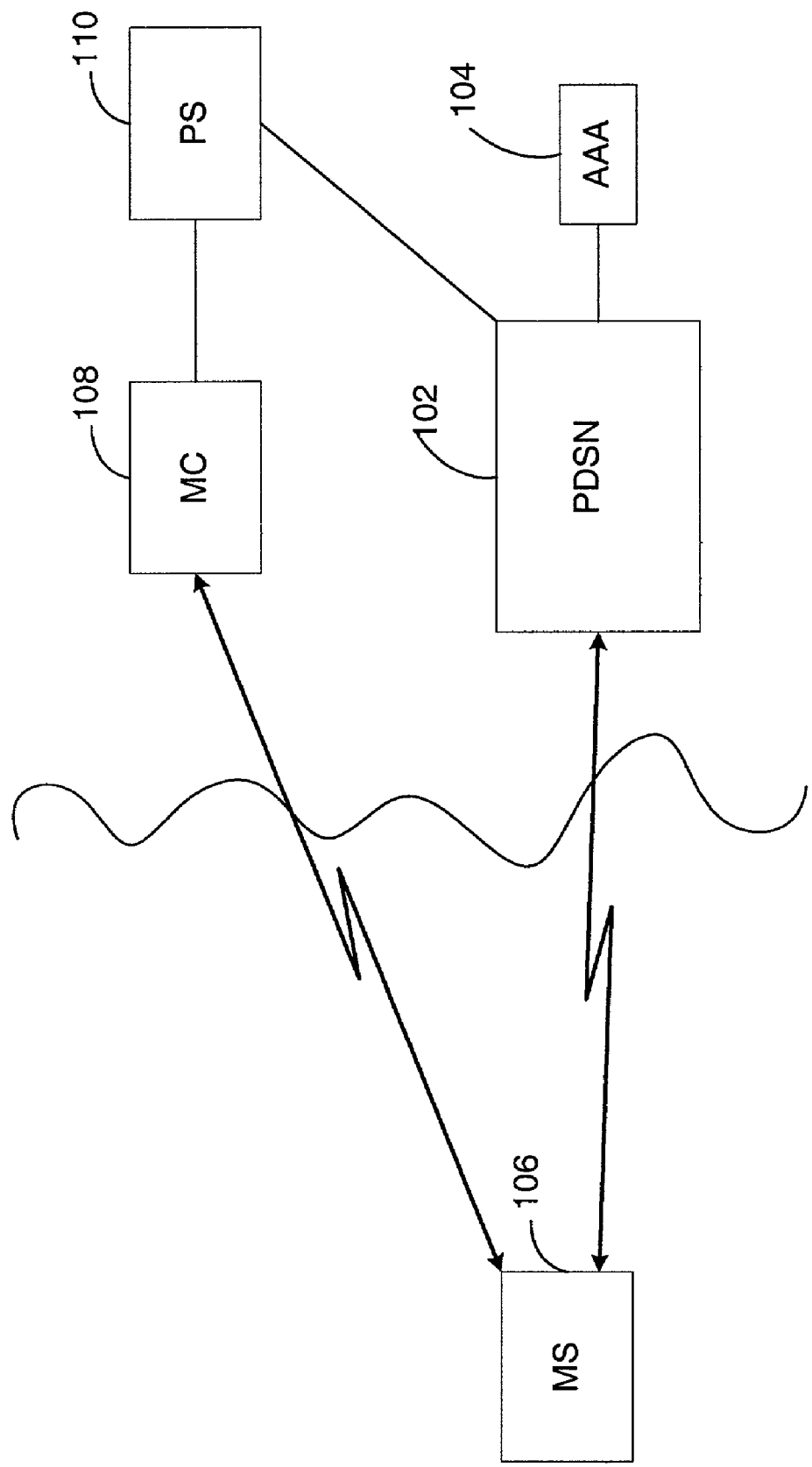
FIG. 1 is a communication system having a wireless portion and an Internet Protocol portion.

A communication system 100 according to one embodiment is shown in FIG. 1. The communication system 100 includes both wireless portions and Internet Protocol (IP) portions. A Mobile Station 106 operating within communication system 100 is in communication with Packet Data Service Node (PDSN) 102. The PDSN 102 is a connection point in a wireless communication network, such as a cdma2000 Packet Core Network (PCN) that forwards data transmissions from a Base Station Controller (BSC) to the Internet in a circuit-switched network. For clarity of understanding the intervening base station and BSC between the MS 106 and PDSN 102 are not shown. The AM server 104 employs a framework for network management and security that controls access to computer resources by identifying unique users, authorizing the level of service, and tracking the usage made of resources. An AAA server 104 interacts with the PDSN and with databases and directories that contain user information. Operation of system 100 may be as specified in the cdma2000 Wireless IP Network Standard.

The Message Center (MC) 108 is part of the service provider. The MC 108 controls transmission and receipt of Short Message Service (SMS) type services. SMS is a means to send or receive short alphanumeric messages to or from mobile devices. The MC 108 is also in communication with a Provisioning Server (PS) 110.

Figure 2:
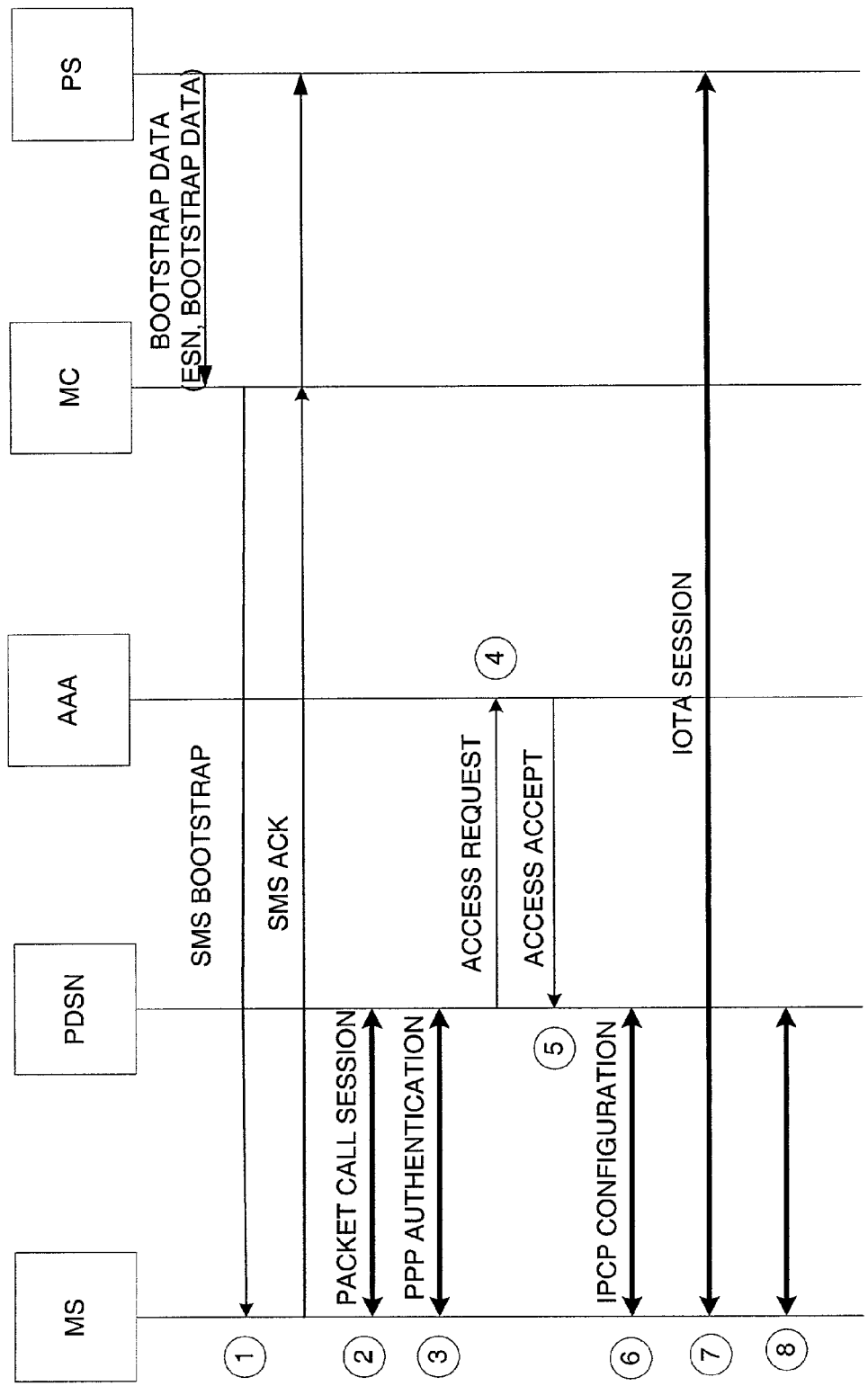
FIG. 2 is a timing diagram illustrating communication of provisioning parameters from an IP-based server to a mobile device.

FIG. 2 illustrates, in timing diagram form, provisioning according to one embodiment of the present invention. At a first time t0 the MS 106 requests provisioning information from the service provider via MC 108. For example, the user calls the service center and provides the user's identity (e.g., social security number, etc.). Then, the service center triggers the PS to begin the bootstrap procedure for the user's MS. The request for provisioning information triggers the PS 110 to provide specific data to the MC 108 referred to as "bootstrap data." The bootstrap data includes information sufficient to enable the MS 106 to communicate with the PS 110 via the Internet Protocol (IP) Once communication with the PS 110 is established, the PS 110 provides the provisioning parameters to the MS 106. To provide the bootstrap data to the MS 106, the MC 108 employs the SMS. Specifically, the bootstrap data is provided as a short message at time t1. The bootstrap data includes a temporary Network Access Identifier (NAI), a temporary Shared Secret (SS) if used, an IP address for the PS 110 or an URL for the PS, and security information. Alternate embodiments may include any of a variety of types of information to facilitate contact and communication between the MS 106 and the PS 110. The NAI is typically used to uniquely identify the mobile device. The NAI may be of the form: user@service.com. In this case, the NAI is for temporary usage for the MS to access the PS and receive provisioning parameters. The use of a temporary NAI allows the system to allocate resources more flexibly. Once a given mobile device has received the provisioning parameters, the NAI used to access the PS may be assigned to another mobile device. The temporary SS is associated with the temporary NAI and will be used by the AAA server to authenticate the MS's request to establish a temporary packet data session for accessing the PS. There may be several pairs of temporary NAI and SS, in order to allow multiple users accessing the PS simultaneously.

Continuing with FIG. 2, after receipt of the bootstrap data via the SMS service message(s), the MS 106 authenticates the PS 110 using the designated security mechanism [WAP-183] and a key shared between the MS and PS. In one embodiment, the share key consists of an Electronic Serial Number (ESN) and a Service Programming Code (SPC). The ESN is a 32-bit number assigned by the mobile device manufacturer, uniquely identifying the mobile device equipment. Alternate embodiments may implement alternate schemes for determining a key shared by the MS and PS. When a temporary SS is included in the bootstrap data, the process should protect it. In one embodiment, the temporary SS is encrypted by the PS 110 using the key consisting of the concatenation of ESN and SPC.

On successful PS 110 authentication by the MS 106, the MS 106 responds with an SMS ACKnowledge (ACK) message to the MC108. The SMS ACK notifies the MC 108 that the MS 106 received the bootstrap data successfully. Next, the MS 106 initiates a simple IP packet data call by establishing a Point-to-Point Protocol (PPP) session with the PDSN 102 at time t3. A Mobile IP packet data call is not be required, as the MS 106 most likely will remain within the serving area of the PDSN 102. In the event the MS 106 changes PDSN serving area, the MS 106 may establish another simple IP packet data call with the new PDSN. For PPP authentication, the MS 106 uses the Challenge Handshake Authentication Protocol (CHAP). CHAP is used to verify the identify of a peer in a 3-way handshake, and is usually embedded in other protocols, such as in PPP. During the PPP authentication using CHAP, the MS 106 uses a temporary NAI and SS (if used). Note that in one embodiment, the AAA 104 stores the temporary NAI, SS pairs. When accessing the information, the NAI maps to the associated SS.

The PDSN 102 sends an Access-Request to the MA 104 at time t4. The Access-Request includes the NAI and a challenge response consistent with CHAP. In response, the AAA 104 recognizes that the mobile device, MS 106, is requesting temporary access to the PS 110 to gain provision parameters. The MA 104 then authenticates the user. The temporary NAI and SS (if present) are configured in the AAA by the operator. When the MS 106 authentication is successful, the AAA 104 may assign a private IP address to the MS 106. The AAA 104 provides the private IP address to the PDSN 102 in an Access-Accept message. The Access-Accept message is sent at time t5. Note that in an alternate embodiment the PDSN 102 may select the private IP address for the MS 106.

The PDSN 102 receives the Access-Accept including the user-name attribute, and recognizes the user, MS 106, is requesting access to the PS 110 to gain provisioning parameters. If the Access-Accept does not include an assigned IP address for the MS 106, the PDSN will assign a private IP address for the mobile.

At time t6, the assigned private IP address for the MS 106 is sent to the MS 106 via PPP and Internet Protocol Control Protocol (IPCP). The IPCP allows negotiation of desirable IP parameters. The PDSN 102 then performs access control of the MS 106, allowing communication only with the PS and DNS server 110. The access control by the PDSN 102 prevents the MS 106 to access the carrier's services or the Internet. The access control is desirable, as at this point in the process, the MS 106 has not yet been authorized for packet data service or any other service, and access to a carrier's valuable services is to be protected. Specifically, the PDSN 102 checks the destination IP address field of the IP packets sent by the MS 106. The MS 106 is identified by the assigned private IP address. If the destination IP address is not that of the PS and DNS server 110, the PDSN 102 discards the packets. Similarly, packets destined for the MS 106 are discarded unless the source IP address is that of the PS and DNS server 110. The PDSN may allow the MS to access the DNS server in a scenario wherein the MS receives the URL of the PS (instead of the IP address of the PS). In this case, the MS is required to send a DNS query (containing the URL of the PS) to a carrier's DNS server that replies a DNS response (containing the IP address of the PS).

The MS 106 at this point, has been assigned a private IP address and has received the IP address of the PS 110. The MS 106 has sufficient information to receive the provisioning parameters from the PS. At time t7, the MS 106 initiates an IP-based Over-The-Air (IOTA) handset configuration management session. The provisioning parameters may include, but are not limited to, Network Architecture Model (NAM), Message Disposition Notification (MDN), International Mobile Station Identity (IMSI), Preferred Roaming List (PRL), Preferred User Zone List (PUZL), as well as other parameters and information, such as that specified in the TIA/EIA-683-B. Additional parameters may include those specified for a WAP browser, Provisioning Content (WAP-183-PROVCONT). Additionally, to avoid eavesdropping, the PS 110 and the MS 106 may employ a shared secret using the ESN and SPC to encrypt the IOTA session.

During the IOTA session, the MS 106 receives the provisioning parameters sufficient to support communication with the service provider, such as voice calling or packet data services. At a time t8 the MS 106 initiates a call, such as a packet data call. Once the provisioning parameters are correctly received by the MS 106, the MS 106 may initiate any of the services available through the service provider.

Figure 3:
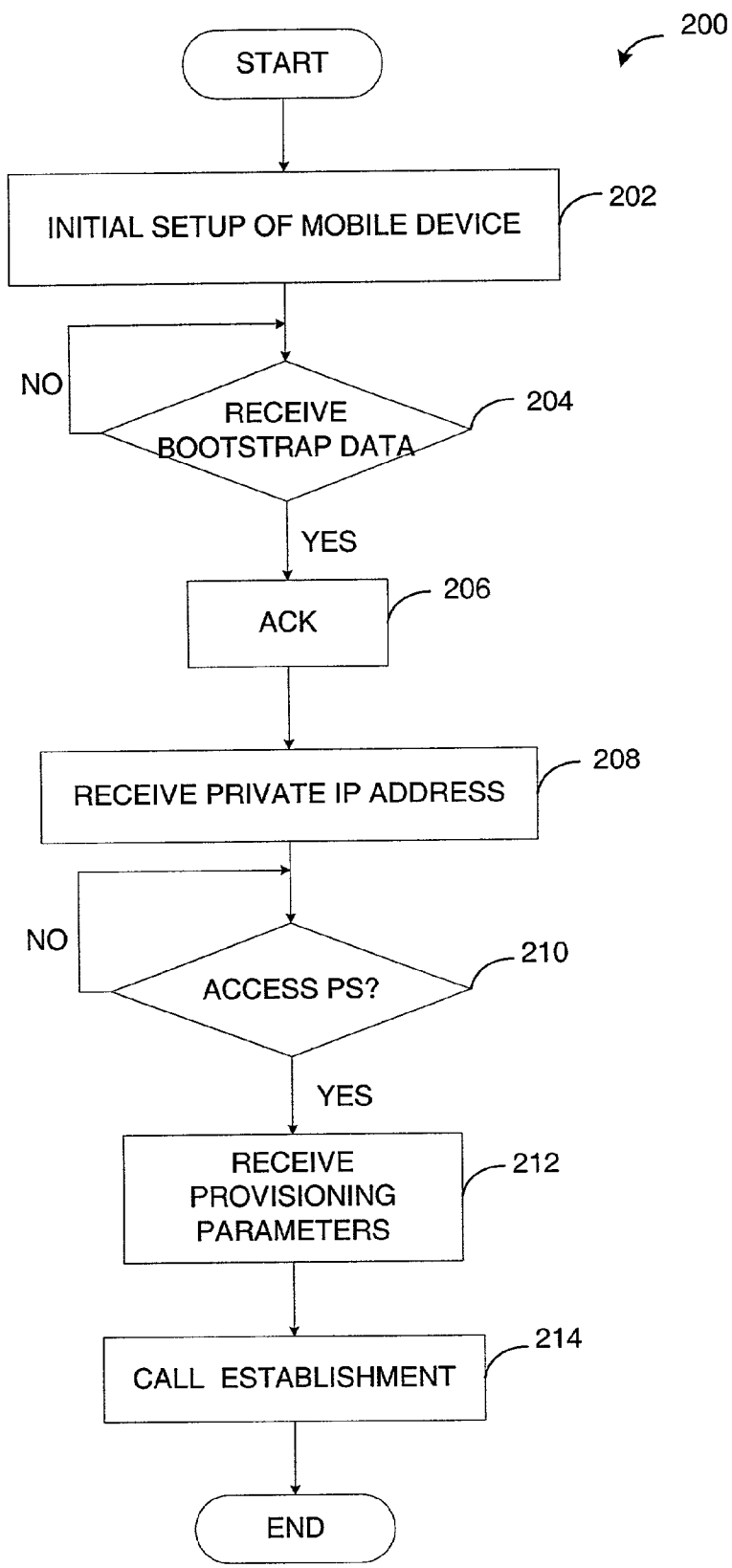
FIG. 3 is a flow chart illustrating a mobile device gaining provisioning parameters from an IP-based server.

FIG. 3 illustrates operation at the mobile device, MS 106, wherein a process 200 is used to gain the provisioning parameters. At step 202 the mobile device initiates an initial setup procedure. The initial setup is performed to gain access to the service provider. The mobile device may send a request for such information to the MC 108. If the mobile device receives the bootstrap data at decision diamond 204, processing continues to step 206 to confirm receipt of the bootstrap data by sending an ACK message. If the mobile device does not receive the bootstrap data, the mobile device waits for such data. The mobile device receives a private IP address at step 208, wherein the private IP address is not globally routable, but is used by the PDSN and service provider to identify the mobile device. If the mobile device tries to access any IP address other than that of the PS at decision diamond 210, the PDSN discards the packets of data sent and no action is taken at step 210. If the mobile device accesses the PS processing continues to step 212 to receive the provisioning parameters. At step 214 the mobile device may establish a communication.

As described hereinabove, methods for providing provisioning parameters to a mobile device uses an SMS service to provide information sufficient to access an IP-based server. The mobile device establishes contact with the IP-based server, and receives the provisioning parameters thereby. The communication with the IP-based server applies a private IP address to the mobile device. The mobile device has limited access to the IP-based server and is prevented access to other services of the service provider pending authentication. The methods described hereinabove is beneficial in low-cost devices, such as data cards, that do not support more complex protocols, such as the WAP browser. Such low-cost devices need not support WAP specifications as detailed in WAP Provisioning Bootstrap Specification, WAP-184-PROVBOOT, and/or WAP Binary XML Content Format (WBXML) as defined in WAP-192. The methods described hereinabove utilize simpler IP protocols.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method in a mobile device, comprising:
   receiving bootstrap data via a short messaging service message from a message center, the bootstrap data sufficient to establish a communication between the mobile device and an Internet Protocol-based server wherein the bootstrap data includes a temporary network identifier, network addresses and security information;
   establishing communication with the Internet Protocol-based server; and
   receiving provisioning parameters from the Internet Protocol-based server.

2. The method as in claim 1, further comprising:
   acknowledging receipt of the bootstrap data via an acknowledge message transmitted to the message center.

3. The method as in claim 1, further comprising:
   receiving a private Internet Protocol address for communication with the Internet Protocol-based server.

4. The method as in claim 1, wherein the bootstrap data includes an Electronic Serial Number.

5. The method as in claim 1, wherein the bootstrap data includes an Internet Protocol address of the Internet-based server.

6. The method as in claim 1, wherein the bootstrap data includes a Network Architecture Identification.

7. The method as in claim 6, wherein the Network Architecture Identification is associated with a shared secret.

8. A method in a communication system, comprising:
   sending bootstrap data via a short messaging service to a mobile device, the bootstrap data sufficient to establish a communication between the mobile device and an Internet Protocol-based server wherein the bootstrap data includes a temporary network identifier, network addresses and security information; and
   sending provisioning parameters to the mobile device from the Internet-Protocol-based server.

9. The method as in claim 8, wherein sending provisioning parameters further comprises:
   establishing an Internet Protocol-based Over-The-Air handset configuration management session.

10. The method as in claim 8, further comprising:
    providing a private Internet Protocol address to the mobile device; and
    controlling access of the mobile device by limiting access to the Internet Protocol-based server.

11. The method as in claim 10, wherein controlling access of the mobile device comprises discarding packets of data having a destination address other than the Internet Protocol-based server.

12. A mobile device, comprising:
- means for receiving bootstrap data via a short messaging service message from a message center, the bootstrap data sufficient to establish a communication between the mobile device and an Internet Protocol-based server wherein the bootstrap data includes a temporary network identifier, network addresses and security information;
- means for establishing communication with the Internet Protocol-based server; and
- means for receiving provisioning parameters from the Internet Protocol-based server.

13. A wireless infrastructure element, comprising:
- means for sending bootstrap data via a short messaging service to a mobile device, the bootstrap data sufficient to establish a communication between the mobile device and an Internet Protocol-based server wherein the bootstrap data includes a temporary network identifier, network addresses and security information; and
- means for sending provisioning parameters to the mobile device from the Internet Protocol-based server.

\* \* \* \* \*